June 29, 1971   F. B. LEITZ, JR., ET AL   3,589,942
BIPOLAR COLLECTOR PLATES
Filed Dec. 22, 1966   2 Sheets-Sheet 1
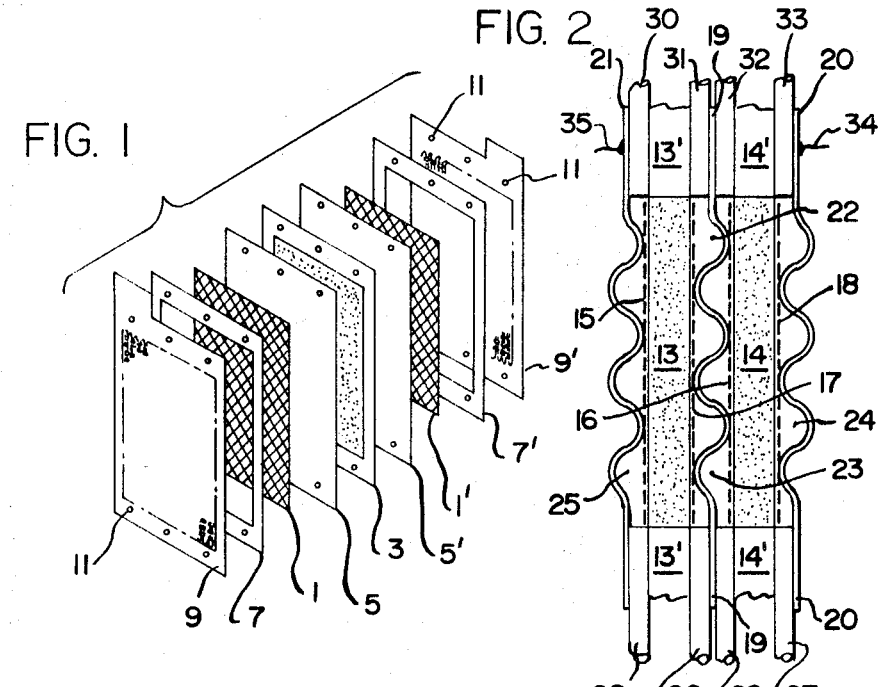
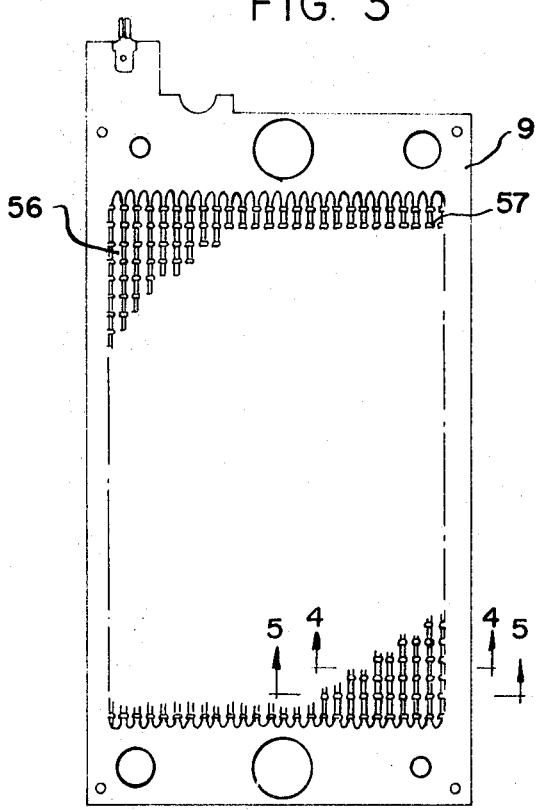
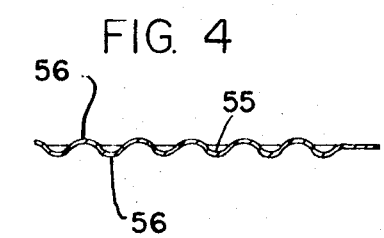
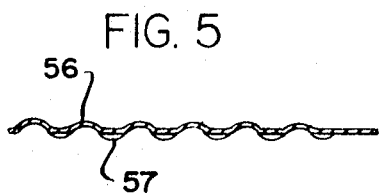
INVENTORS
FRANK B. LEITZ JR.
DONALD K. FLEMING
BY Bair, Freeman & Molinare
ATTORNEYS

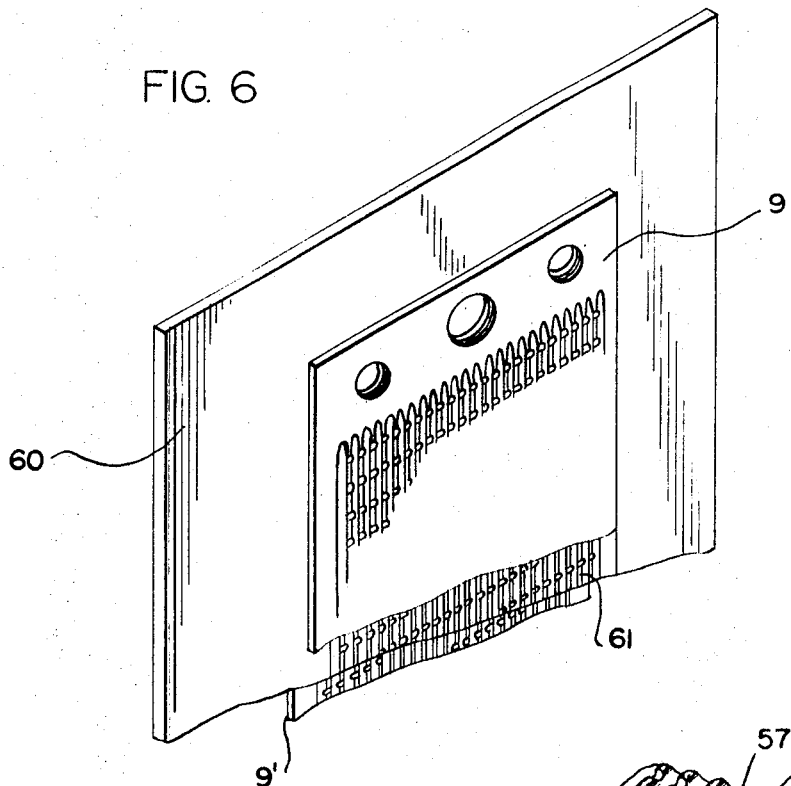
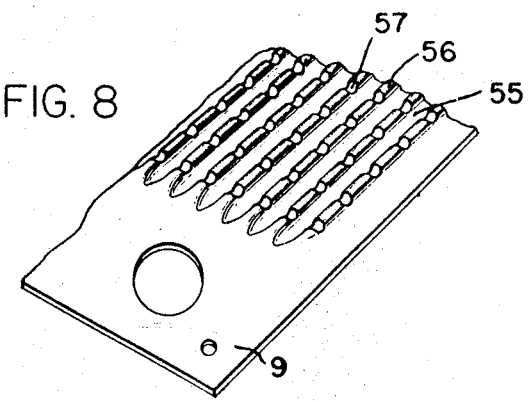
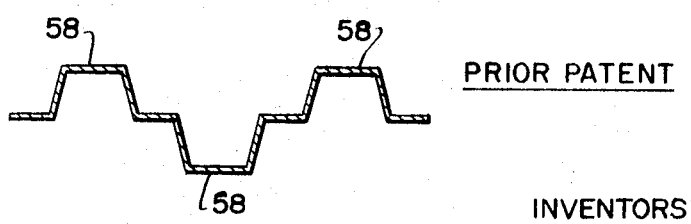
PRIOR PATENT
INVENTORS
FRANK B. LEITZ JR.
DONALD K. FLEMING
BY Bair, Freeman & Molinare
ATTORNEYS.

United States Patent Office 3,589,942
Patented June 29, 1971

3,589,942
BIPOLAR COLLECTOR PLATES
Frank B. Leitz, Jr., Weston, Mass., and Donald K. Fleming, Park Ridge, Ill., assignors to Consolidated Natural Gas Service Company, Inc., Pittsburgh, Pa., Southern California Gas Company and Southern Counties Gas Company of California, both of Los Angeles, Calif., fractional part interest to each
Filed Dec. 22, 1966, Ser. No. 603,801
Int. Cl. H01m 27/00
U.S. Cl. 136—86
12 Claims

ABSTRACT OF THE DISCLOSURE

A bipolar collector plate having vertically oriented ridges and grooves that are hemispherical in cross-section. The adjoining ridges are connected by cross-grooves of a lesser depth than the vertical ridges and grooves. The range of radius of curvature of the ridges is critical and varies between 0.25 and 0.01 inch. The plates may be of a single material, preferably columbium, tantalum, stainless steel or nickel, or may be of a composite material such as particles of carbon, carbides, nitrides and borides impregnated with a binder such as poly-tetrafluoroethylene, poly-chlorotrifluoroethylene, copolymers of poly-chlorotrifluoroethylene with vinylidene fluoride, polyolefins, or an epoxy, polyester or phenolic resin. The plate may also be a laminate having a heat conductive core. An embodiment has extended peripheral edges forming a heat conductive flange for contact with a heat conductive fluid to control the operating temperature of the cell.

BACKGROUND

Field

This invention relates to a novel bipolar collector plate for use e.g., in an electrochemical fuel cell for separating adjacent electrodes in a plurality of cells adjoined in series in battery array. The bipolar collector plate is not limited to use in a fuel cell, being useful in electrochemical cells in general, others being electrolysis cells and electro-osmosis cells.

By way of background and considering fuel cells as a typical example, low temperature fuel cells comprise basically (1) a pair of electrodes at which the oxidation and reduction reactions take place, (2) an electrolyte, either acid or base, between the electrodes, (3) means for providing fuel gas and oxygen to respective electrodes, (4) means for exhausting waste products from the electrodes, and (5) electrical contact means on the electrodes for directing external electron flow. When two or more cells are placed in electrical series to form a battery, it is necessary to separate the cathode of one cell from the anode of the next, while maintaining electrical contact therebetween, and this has been done by provision of a bipolar collector plate.

Prior art

Heretofore, there has been no bipolar plate that is entirely satisfactory. In one known bipolar plate, described in NASA Report CR-54436 (American Cynamid Co.), there is the combination of bipolar plate, reactant distributor and temperature control device. Such combination, however, does not provide for current collection and a mesh screen is inserted between the bipolar plate and the eltrode for such purpose. That structure not only is extremely difficult to manufacture, but also offers two additional contact resistances in the flow of electrons between the cells, and provides an undesirably long metallic path for electron travel between the cells.

Other known bipolar plate designs are unsatisfactory for various reasons, including the requirement for use of electro-plated materials and plate configurations which do not permit maximum utilization of the electrode contact area. Beltzer et al., U.S. Pat. No. 3,234,050 describes a plate design in which plate-electrode contact occurs at flat ridges on the plate, resulting in poor gas distribution to the electrode, as well as obscuring a substantial portion of the electrode.

SUMMARY

Objects

It is therefore among the objects of this invention to provide a bipolar collector plate for use with a low temperature fuel cell system wherein the plate design and configuration provides for good electrode distribution of reactant gases, good electrical conductivity between electrodes of adjacent cells and good current collection properties.

It is the further object of this invention to provide a bipolar collector plate which is designed to effect heat transfer from the cell as a means for temperature control.

Other objects of this invention will become apparent as it is more fully described hereinafter.

The invention

Separation of adjacent electrodes, according to our invention, can be effected by use of novel bipolar plates which are embossed with both vertical and cross grooves having a critical configuration. These plates function as (1) a barrier to the intermixing of reductant gases at the anode of one cell with oxidant gases at the cathode of the adjacent cell, (2) a double current collector, forming an excellent electrical contact with the electrodes of the cells, (3) a bipolar connector, electrically interconnecting the anode of one cell with the cathode of the adjacent cell, permitting electron flow from anode to cathode, and (4) a double reactant distributor, effecting distribution of reductant gases to the anode reaction cites on one cell and oxidant gas to the cathode reaction cites on the adjacent cell. Additionally, in one modification of our invention, the bipolar plates serves an additional function as (5) a heat collector and heat sink carrying heat from the interior of the cell to the exterior where the heat may be dissipated, thus improving the performance of the cell by providing a means for temperature control of the battery.

DRAWINGS

In the drawings:
FIG. 1 shows, in exploded view, the elements of a typical fuel cell utilizing the bipolar collector plates of this invention;
FIG. 2 is a diagrammatic view showing two adjacent cell units of a battery array utilizing the novel bipolar collector plates of this invention;
FIG. 3 is a detail front view showing the configuration of one embodiment of the bipolar collector plate of this invention;
FIGS. 4 and 5 are views through lines 4—4 and 5—5 respectively of FIG. 3.
FIG. 6 is a view in perspective showing another embodiment of the plate of the invention.
FIG. 7is a view of the cross-sectional configuration of the bipolar plate of a prior published patent.
FIG. 8 is a perspective view of the bipolar collector plate embodiment of this invention shown in FIG. 3.

SOME PREFERRED EMBODIMENTS

A typical fuel cell utilizing the bipolar collector plate of this invention is shown in FIG. 1. The cell comprises a pair of electrodes 1, 1' between which is sandwiched an electrolyte compartment consisting of an electrolyte-filled section 3 and membranes 5, 5'. Alternatively, the electrolyte compartment may consist of an absorbent mat of, e.g., glass fiber as described and claimed in copending application Ser. No. 605,413 filed Dec. 28, 1966. Outside each electrode are gaskets 7, 7' to which are held the bipolar plates 9, 9', the subject of this invention. The cell is provided with manifolds, three of which are indicated by numerals 11, for supplying and exhausting fuel and oxidant gases, waste products and electrolyte. Details of operation of the cell are well known in the art and are described, e.g., in Hydrocarbon Fuel Technology, 1965, Academic Press, Inc., New York, pp. 37–50.

FIG. 2 shows in diagrammatic cross section two adjacent cells within a battery having the bipolar collector plates of this invention. Electrolyte zones 13 and 14 comprise matrices or the like impregnated with immobilized electrolyte, free electrolyte with ion exchange membranes, or free electrolytes with other retention techniques. Gaskets or impregnated edges of the matrix are represented at 13', 14'. Adjacent anodes 15, 16 and cathodes 17, 18 are bipolar plates 19, 20 and 21. Where plates 20 and 21 are respectively at each end of the battery, they are not true bipolar collector plates, but are the respective terminal plates. Bipolar plate 19 separates the zone between the anode 16 and cathode 17 into an oxidant receiving zone 22 and a fueling zone 23. Another oxidant zone is identified as 24 and a fueling zone 25. The bipolar plate, being electrically conductive, serves to provide electrical contact from the anode 16 of one cell to the cathode 17 of the next cell for a series hook-up to provide a battery. The bipolar plate 19 also acts as a current collector from anode 16 and cathode 17, and effectively distributes the reductant gas in fueling zone 23 to anode 16 and the oxidant in oxidant zone 22 to cathode 17. Conduits 28 and 29 serve to admit a fluid combustible fuel reductant e.g. hydrogen, methyl alcohol, propane, hydrocarbons or the like to reductant fueling zones 25 and 23 respectively. Conduits 26 and 27 are provided for admitting oxidant gas, e.g. oxygen, air, chlorine, or the like to oxidant zones 22 and 24 respectively. Conduits 30, 31, 32 and 33 are provided as exhaust outlets from zones 25, 22, 23 and 24 respectively. Conductors 34 and 35 contact terminal plates 20 and 21 and are leads to an external circuit (not shown).

Generation of power by the battery is carried out in accordance with conventional fuel cell practice well known in the art. Electrolyte zones 13 and 14 may be equilibrated with suitable electrolyte, e.g. sulfuric acid, phosphoric acid, potassium hydroxide, etc.

The preferred design of the bipolar plate 9 of this invention is shown in FIG. 3. Although a variety of embossing patterns have been tried and tested, we have found that the most satisfactory pattern consists of the base plate having embossed therein longitudinal, alternating grooves 55 and ridges 56 rounded on both surfaces as best seen in cross section in FIG. 4, and in perspective in FIG. 8.

It will be appreciated that the ridges appearing on one side of the plate appear as grooves on the reverse side. We have also found that improved utilization of the gases and improved strength of the plates results if shallow or sharper cross-grooves or cross-ridges 57 are also utilized in the pattern, as shown best in FIGS. 3, 5 and 8. The cross-grooves give the plate rigidity and partially deflect gas flow along longitudinal grooves 55. Although, as illustrated in FIGS. 3 and 4, the cross-grooves are formed only on one side of the plate, alternate rows of cross-grooves 57 may be formed from opposite sides, or alternate grooves 55 may have cross-grooves 57 formed from opposite sides. Preferably, the depth of the grooves should be between 0.010 and 0.200 inch.

We have found as a critical feature of our invention that the radius of curvature of the grooves should not be greater than 0.25 inch at the point of contact with the electrodes. If the radius is greater, a significant fraction of the electrode surface will be occluded thus lessening the efficiency and output of the cell and battery. For example, the plate-electrode contact in the aforementioned Beltzer et al. patent issued prior to this application, as illustrated by item 58 in FIG. 7, covers a significant area of the electrode, preventing maximum contact with the reactant gas, either fuel or oxidant. Compared to the bipolar plate configuration of the present invention, a battery employing a plate similar to the Beltzer et al. plate, with flat contacts, has been found to have a lower output.

Similarly, we have also found that the other end of the radius of curvature range is critical. Where the radius of curvature is less than 0.010 inch, the acid from the electrolyte compartment will be leached out and replaced by water. Although we do not wish to be bound by any particular theory, our investigations lead us to believe that the leaching is due to a surface tension phenomenon that occurs where the plate-electrode contact angle is high. The leaching, by diluting the electrolyte, shortens the cell life as well as the output and efficiency.

We have also discovered that the radii of curvature and the groove depth above noted are functions of the electrode construction and the material which reinforces the electrode in the electrolyte compartment. The values given above are for electrodes reinforced with 50-mesh screen in contact with relatively soft electrolyte compartment material such as a fibrous matrix or ion exchange membrane. With very hard, stiff compartment material, the radius is increased and the groove depth may be decreased. Conversely with extremely soft materials, the reverse is true.

The spacing between the grooves is a function of the electrical conductivity of the electrode. Above ⅜ inch, the voltage loss due to the electrode resistance, when the electrode contains a 50-mesh, 0.003-inch diameter wire screen, becomes noticeable. The minimum spacing and depth of embossing are interrelated and are limited by the imprint perforation or distortion of the plate. The longitudinal rib pattern gives a lower pressure drop and better distribution of the reactant gases for the same flow rate than any other pattern tested.

The plate of this invention must be made of a material which is an electrical conductor, is non-porous, and does not form a non-conductive film which would increase the contact resistance. In addition to the resistance to attack by the electrolyte, it must resist this attack under conditions of anodic and cathodic potential, in order that the plate will not dissolve, such as in the stripping action of gold from a gold-plated object. The sheet material from which the plates are made is preferably between 0.001 and 0.50 inch thick.

For cells utilizing electrolytes such as sulfuric or phosphoric acid, tantalum and columbium have been found to be satisfactory. If hydrochloric acid is used, it is necessary to coat the plate with platinum to maintain conduction to the plate. For alkaline cells, stainless steel and nickel are preferred plate materials.

Alternatively, the bipolar collector plate may be made of electrically conductive materials such as carbon, carbides, nitrides or borides, such as $CoC_2$, $Mn_{23}C_6$, $NbC$, $NbN$, $B_4N$, $FeB$, $TaB_2$, $NbB_2$, $UB_2$, $UB_{12}$, $ThB_6$, $SrB_6$, $CaB_5$, $MgB_{12}$, $YB_6$, and similar materials.

In this alternative construction, the conductive material is formed into a continuous phase, e.g. as by pressing or pressing and sintering, and is then impregnated with a non-porous binder e.g., a Teflon such as poly-tetrafluoroethylene (TFE), poly-chlorotrifluoroethylene (CTFE), or copolymers of CTFE with vinylidene fluoride ($VF_2$) such as Kel-F brand KF-800 or 827 of the 3M Company, or phenolic, epoxy or polyester resins, and other polyolefins such as polyethylene, polypropylene and polystyrene, and compatible mixtures of those polymers. The binder serves both to hold the particles of the electrically conductive material in a rigid form and to provide a plate impervious to the flow of gas and electrolyte. In this embodiment of our invention, the percentage of electrically conductive material must be sufficiently high to provide a continuous phase throughout the plate and on the surface so that an electrical contact and electrical path will be maintained betwen the electrodes of adjacent cells in the battery or to the output circuitry as required. For example, a powered conductive material may be pressed with a binder, or may be pressed sufficiently to hold its shape and dipped into a solution of Kel-F in methyl ethyl ketone to impregnate the plate by filling the interstices. The surface should then be cleaned of binder to provide good electrical contact, for example by milling, sanding, scrubbing with binder solvent, or surface pyrolysis.

Plates as above described have been used in fuel cells of 0.10, 0.25 and 0.70 sq. ft. in cross section. The performance of the cells with a total active area of 0.70 sq. ft. per cell is essentially identical to that of small test cells of 0.04 sq. ft. per cell, attesting to the excellent performance of this type of bipolar plate.

The comparative performances of the types of ribs are illustrated in the following non-limiting examples:

EXAMPLE 1

A typical fuel cell of the construction shown in FIG. 1 having 0.04 sq. ft. active area per cell was fitted with bipolar collector plates having the hemispherical ribs of our invention. The cell delivered 0.58 volts at 100 amps/sq. ft.

EXAMPLE 2

A fuel cell as in Example 1 was fitted with bipolar collector plates having flattened ribs. The cell delivered 0.45 volt at 100 amp/sq. ft.

EXAMPLE 3

A fuel cell as in Example 1 fitted with pointed ribs showed good initial performance of .58 volt at 100 amp/sq. ft., but the output deteriorated rapidly to 0.40 volt at 40 amp/sq. ft. within 14 days. The electrolyte acid was then replaced in the matrix with a recovery to the initial values, but the performance then deteriorated at about the same rate.

FIG. 6 shows still another embodiment of our bipolar collector plate invention in which the outer periphery of the plate extends beyond the limits of the gasketing of the cells. The extended portion of the plate is a fin 60 of heat conductive material for control of temperature of the cell by application or removal of heat via natural or forced air conduction or convection, radiant heating or cooling or circulation of a heat conductive liquid. The plate shown in FIG. 6 may be the laminate shown or may be an appropriately embossed soild metal plate of, e.g., tantalum or columbium. Preferably, the laminate is made of a core 60 of base metal of high thermal and electrical conductivity, e.g. a sheet of copper or aluminum, which is thicker than the plate shown in the embodiment of FIGS. 1–5. The faces of the base metal are clad, such as with the sheets 9, 9', or with an electrically conductive, embossable corrosion resistant material secured to the base metal by techniques such as welding, explosive bonding, or the like. The relative thickness of the plate permits thermal transfer from the fins extending outside of the cell boundaries without undue electrical loss in the bipolar function of the plate. When the lamination is achieved concurrently with the embossing of the pattern, the laminate fin-forming core 60 will have the grooves and ridges impressed therein as at 61 (FIG. 6).

A satisfactory technique for manufacture of the plates is pressing the sheet material between a female die and a compressible rubber or polymer of the type shown as "Isothane" manufactured by the Carborundum Corporation. With proper design of the die, this pressing may be a drawing operation. However, a simplified die, made by simply milling grooves with a radius cutter, is satisfactory and the pressing is essentially an embossing operation. Equally satisfactory results may be achieved by use of conventional "hydroforming" techniques.

Having described our invention, those skilled in the art will recognize that various modifications can be made thereto within the skill of the art, and we intend our invention to be limited solely by the appended claims.

We claim:
1. A fuel cell battery comprising a plurality of cells each of which includes:
   (a) a pair of electrodes at which oxidation and reduction reactions take place, said electrodes being an anode and a cathode,
   (b) electrolyte disposed between said electrodes,
   (c) means for providing fuel and oxidant to the respective electrodes,
   (d) means for exhausting waste products from said electrodes,
   (e) the cathode of one cell being separated from the anode of an adjacent cell by means of a bipolar collector plate of electrically conductive sheet material disposed between said cathode and said adjacent anode and in electrical contact therewith,
   wherein the improvement is that said bipolar collector plate consists essentially of:
   (f) a sheet material having a plurality of parallel alternating grooves and ridges of generally sinuous cross section,
   (g) said ridges and grooves being in contact with said cathode and adjacent anode respectively,
   (h) each of said grooves and ridges having a generally hemispherical cross section of radius of curvature between about 0.25 and 0.01 inches at the point of said contact with said cathode and adjacent anode,
   (i) adjacent ridges are connected by cross-grooves or cross ridges spanning said intervening grooves,
   whereby no significant fraction of the electrode surface is occluded, leaching of electrolytic is retarded, rigidity is imparted to said collector plate, and improved fuel and oxidant distribution to electrodes is obtained.

2. A plate of claim 1 wherein the sheet material is a metal selected from the group of columbium, tantalum, stainless steel and nickel.

3. A plate of claim 2 wherein said grooves are between 0.010 and 0.200 inch in depth, and the plate thickness is between about 0.001 and 0.50 inch.

4. A plate of claim 1 wherein
   (j) edge portions of said plate extend outwardly beyond the portion of said plate in contact with electrodes to form a heat conductive flange, and
   (k) said flange is in contact with a heat conductive fluid,
   whereby the temperature of said fuel cell is controlled by transfer of heat between said flange and said fluid.

5. A plate of claim 1 wherein said sheet material comprises particles of carbon, carbides, nitrides and borides impregnated with binder chemically non-corrosive in the electrochemical cell environment, said surface of said plate being substantially free of said binder overlying said particles and said particles forming an electrically continuous path through said sheet.

6. A plate of claim 5 in which said particles are selected from carbon, $CoC_2$, $Mn_{23}C_6$, NbC, NbN, $B_4N$, FeB, $TaB_2$, $NbB_2$, $UB_2$, $UB_{12}$, $ThB_6$, $SrB_6$, $CaB_5$, $MgB_{12}$, and $YB_6$.

7. A plate of claim 5 wherein said binder is poly-tetrafluoroethylene, poly-chlorotrifluoroethylene, copolymers of poly-chlorotrifluoroethylene with vinylidene fluoride, a polyolefin, or an epoxy, polyester, or phenolic resin.

8. A plate of claim 6 wherein said binder is poly-tetrafluoroethylene poly-chlorotrifluoroethylene copolymers of poly-chlorotrifluoroethylene with vinylidene fluoride, a polyolefin, or epoxy, polyester, or phenolic resin.

9. A plate of claim 1 wherein said sheet material is a laminate comprising a core of a material of relatively high thermal conductivity, and an outer layer of a material of relatively lower thermal conductivity than said core, said outer layer being resistant to anodic and cathodic decomposition at the operating conditions of said cell, and said material of said outer layer having an electrically continuous path in said outer layer.

10. A plate of claim 9 wherein said core is copper or aluminum and said outer layer comprises particles of columbium, tantalum, stainless steel, nickel, carbon, carbides, borides or nitrides impregnated with a binder chemically non-corrosive in a fuel cell environment, said surface of said outer layer being substantially free of said binder overlying said particles.

11. A plate of claim 10 wherein said binder is poly-tetrafluoroethylene, poly-chlorotrifluoroethylene, copolymers of poly-chlorotrifluoromethylene with vinylidene fluoride, a polyolefin, or an epoxy, polyester or phenolic resin, and said particles are selected from carbon, $CoC_2$, $Mn_{23}C_6$, $NbC$, $NbN$, $B_4N$, $FeB$, $TaB_2$, $NbB_2$, $UB_2$, $UB_{12}$, $ThB_6$, $SrB_6$, $CaB_5$, $MgB_{12}$ and $YB_6$.

12. A plate of claim 4 wherein said grooves are between 0.010 and 0.200 inch in depth, and the plate thickness is between about 0.001 and 0.50 inch.

References Cited

UNITED STATES PATENTS

| | | | |
|---|---|---|---|
| 2,735,812 | 2/1956 | Van Hoek | 204—301 |
| 3,394,032 | 7/1968 | Danner | 136—86 |
| 3,432,357 | 3/1969 | Dankese | 136—86 |
| 3,445,294 | 5/1969 | Leonard | 136—86 |
| 3,188,242 | 6/1965 | Kordesch et al. | 136—86 |
| 3,395,047 | 7/1968 | Terry et al. | 136—86 |

WINSTON A. DOUGLAS, Primary Examiner

O. F. CRUTCHFIELD, Assistant Examiner

U.S. Cl. X.R.

136—134